United States Patent [19]

Bumgardner

[11] Patent Number: 4,544,122

[45] Date of Patent: Oct. 1, 1985

[54] ADJUSTABLE HEIGHT SUPPORT DEVICE FOR A VIDEO DISPLAY UNIT OR THE LIKE

[75] Inventor: Donald L. Bumgardner, South Lyon, Mich.

[73] Assignee: Northern Telecom Limited, Montreal, Canada

[21] Appl. No.: 624,833

[22] Filed: Jun. 26, 1984

[51] Int. Cl.⁴ .......................................... A47B 91/00
[52] U.S. Cl. ................................................. 248/346
[58] Field of Search ............ 248/165, 349, 159, 188.1, 248/359 E, 346; 108/91

[56] References Cited

U.S. PATENT DOCUMENTS

| 947,978 | 2/1910 | McComb | 248/159 |
|---|---|---|---|
| 1,824,682 | 9/1931 | O'Neil | 248/159 |
| 3,100,459 | 8/1963 | Liss | 108/91 |
| 3,339,752 | 9/1967 | Trogan | 248/159 |
| 3,511,387 | 5/1970 | Maslow | 108/91 |
| 3,713,619 | 1/1973 | Marty | 248/475 |
| 3,807,573 | 4/1974 | Prosdocimo | 108/91 |
| 3,970,792 | 7/1976 | Benham et al. | |
| 4,030,608 | 6/1977 | Howard | 108/94 |
| 4,068,961 | 1/1978 | Ebner et al. | |
| 4,208,072 | 6/1980 | Iskenderian | 108/91 |
| 4,410,159 | 10/1983 | McVicker et al. | |
| 4,428,631 | 1/1984 | Cope et al. | |

Primary Examiner—Reinaldo P. Machado
Assistant Examiner—Alvin Chin-Shue
Attorney, Agent, or Firm—Schwartz, Jeffery, Schwaab, Mack, Blumenthal & Evans

[57] ABSTRACT

An interlocking modular support device for a video display or the like is disclosed. The support comprises ring-shaped modules that are identical one with another. The height of the support is adjusted by varying the number of modules employed. The modules are ring-shaped and lock together with a rotary action. The modules also lock to the video display unit they are supporting as well as to a base unit, larger than the modules, to provide a stable base for the assembly.

4 Claims, 7 Drawing Figures

ADJUSTABLE HEIGHT SUPPORT DEVICE FOR A VIDEO DISPLAY UNIT OR THE LIKE

BACKGROUND OF THE INVENTION

This invention relates generally to a support for a video display unit or the like, and more particularly to a modular support device that permits height adjustment in discrete steps and features interlocking of the modular sections.

The use of video display units is becoming quite common. One use for video display units is as the display portion of a word processing machine. With such a video display unit, it is desirable, to change the viewing position of the video display unit to suit the characteristics of the different users of the display unit.

There are three main adjustments of the video display unit which it is desirable to alter. One adjustment is to provide a swivelling function of the display unit, the second is to provide a tilting function for the display unit, and the third is to adjust the height of the display unit.

One or more of these functions can be found described in the following U.S. patents: U.S. Pat. No. 4,428,631 by R. Cope et al entitled "Computer Keypunch Workstation Having Adjustable Copy Support Shelf" dated Jan. 31, 1984; U.S. Pat. No. 4,410,159 dated Oct. 18, 1983 by H. J. McVicker et al; U.S. Pat. No. 3,970,792 dated July 20, 1976 by E. E. Benham et al; and U.S. Pat. No. 4,068,961 dated Jan. 17, 1978 by J. S. Ebner et al.

SUMMARY OF THE INVENTION

The present invention is directed to a relatively simple and economical method of adjusting the height of a video display unit or the like. The present invention employs a plurality of interlocking ring-shaped modules, which mount underneath the display unit and lock not only to one another but also lock to the display unit, and to a base unit (if used). Height adjustment is achieved by selecting the number of modules that are to be installed.

Stated in other terms the present invention is an interlocking support device for a video display unit or the like, the support device comprising: one or more generally identical modules; each module having an upper section and a lower section, wherein both the lower section of the module can mate with the upper section of another module and the upper section of the module can mate with the lower section of another module; a plurality of leg means within the bounds of the module, protruding from the upper section toward the lower section; each leg means supporting a lip member; a plurality of openings through the upper section, corresponding to the leg means; each opening having both a large portion and a smaller portion such that the leg means of a mating module can pass through the large portion of the corresponding opening and upon relative rotation of two mating modules the leg means can enter the respective smaller portions of the openings whereby the lip members prevent the separation of the two modules along a longitudinal direction.

DESCRIPTION OF THE DRAWINGS

The invention will now be described in more detail with reference to the accompanying drawings, wherein like parts in each of the several figures, are identified by the same reference character, and wherein.

DETAILED DESCRIPTION

Figure 1:
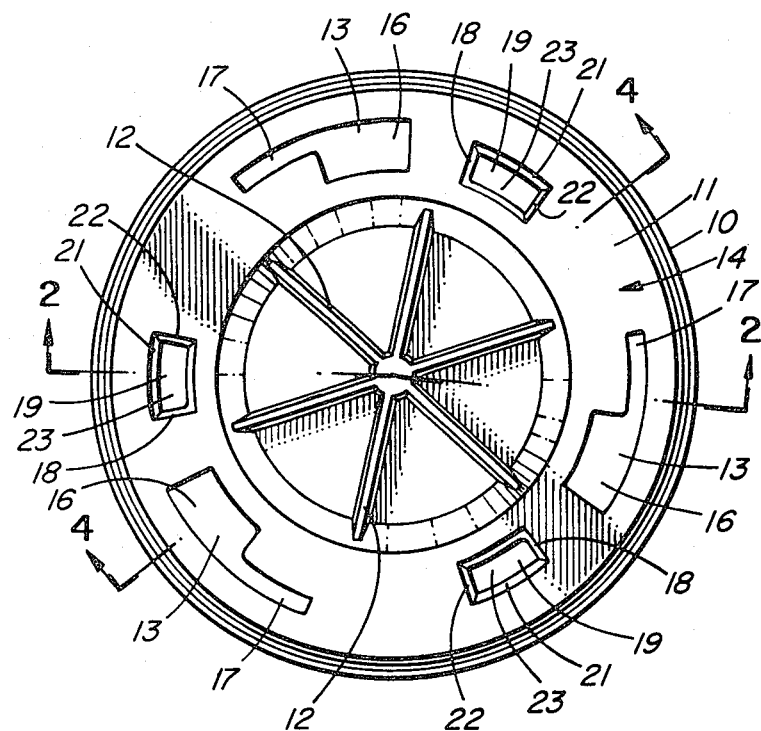
FIG. 1 is a plan view of one of the ring-shaped modules constructed according to the present invention.

FIG. 1 depicts ring-shaped module 10 constructed according to one embodiment of the present invention. Module 10 has a main plastic body portion 11 and towards its center, module 10 has supporting ribs 12. Three openings 13 are provided near the periphery of module 10, having a wide portion indicated generally by the reference character 16, and a narrow portion indicated generally by the reference character 17. It should be noted that openings 13 are evenly spaced about the periphery of module 10, i.e. spaced every 120°.

Also located near the periphery of module 10 are openings 18, which are also three in number. Visible through openings 18 and supported by module 10, are leg portions 19. Each leg portion 19 has two side walls 21 and 22 and a generally rectangular bottom portion 23 (i.e. a lip).

Figure 2:
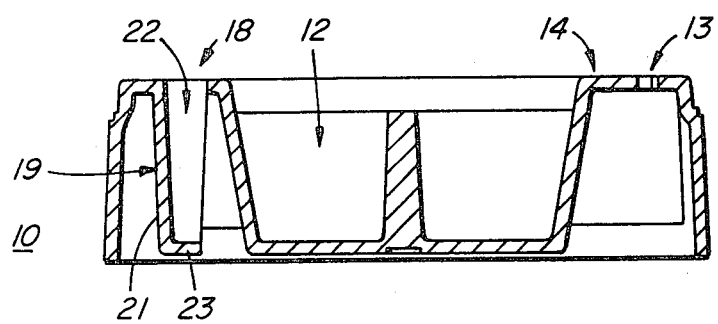
FIG. 2 is a sectional view of the module of FIG. 1 taken through the section line 2—2 of FIG. 1.

FIG. 2 is a view of module 10 of FIG. 1, taken through the section line 2—2 of FIG. 1. FIG. 2 depicts leg portion 19 showing side wall 21, side wall 22, the generally rectangular bottom portion 23. It should also be noted that leg portions 19 are evenly distributed about module 10, i.e. every 120°.

Figure 3:
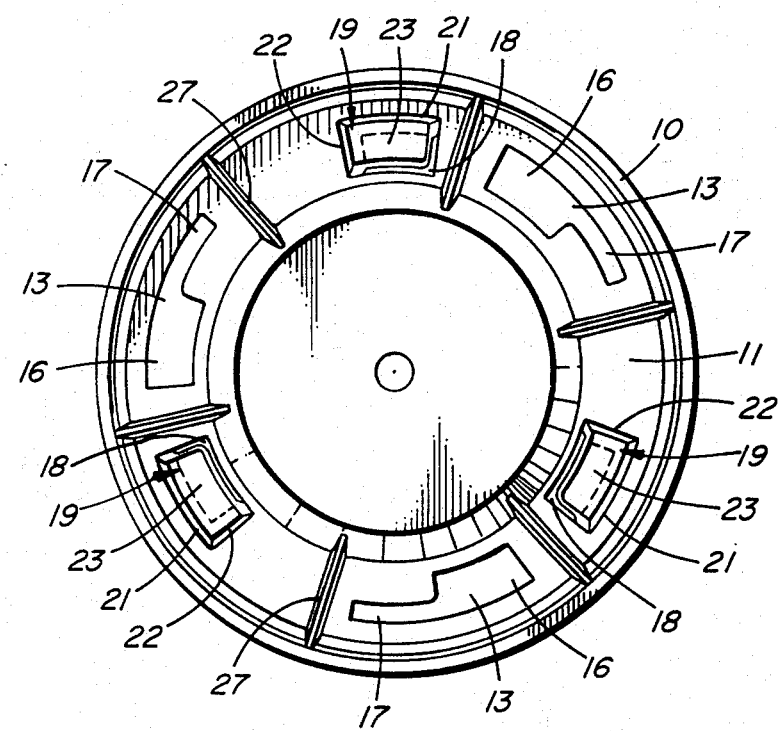
FIG. 3 is a view of the module of FIG. 1, taken from the opposite side to that shown in FIG. 1.

FIG. 3 depicts the opposite side of module 10, as that shown in FIG. 1. In FIG. 3, module 10 is depicted as having supporting ribs 27, openings 13, which pass clear through module 10, leg members 19, which in the FIG. 3 view are of course projecting up out of the paper.

Figure 4:
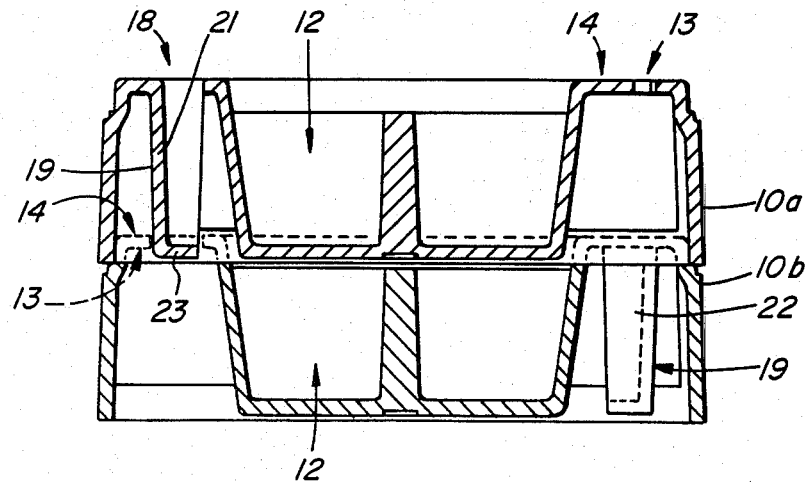
FIG. 4 depicts two of the modules of FIG. 1 stacked together, and shown in section.

FIG. 4 depicts two modules 10 (referred to individually as modules 10a and 10b to aid in their description), stacked on top of one another. It should be noted that the modules 10 are depicted prior to their being rotated into a locked position and that module 10a is shown in the same view as is FIG. 2 while module 10b is shown as taken through the section line 4—4 of FIG. 1. Note that the bottom surface of the upper module 10a is designed to mate into the top surface of the lower module 10b. Note also that both modules 10 are virtually identical, one with another. Note that leg portion 19 of the upper module 10a, has protruded into opening 13, of the lower module 10b. Note also that bottom portion 23 of leg 19 of the upper module 10a, protrudes below upper surface 14 of the lower module 10b. When the modules 10 are rotated relative to one another, side wall 21 is moved from residing generally in the wide portion 16 of opening 13, to residing generally in the narrow portion 17, of opening 13. In so doing, bottom portion 23 is now captured underneath top surface 14 of the lower module 10b. If additional height were required, another module 10 could be attached to the pair of modules 10a and 10b depicted in FIG. 4 to either the top of the upper module 10a, or to the bottom of the lower module 10b. It should be noted that the video display unit with which modules 10 are to be used would of course have its lower surface constructed as is the bottom surface of one module 10 (i.e. so as to mate with the top surface of the upper module 10a). Also, if a wider base were to be desired at the bottom of the modules 10, so as to provide extra stability for the video display unit, then of course the upper surface of that base would be constructed so as to mate with the bottom portion of the lower module 10b (i.e. it would have its upper surface constructed as the upper surface of a module 10).

In one embodiment constructed by the inventor, modules 10 were constructed of plastic (Noryl N-190 manufactured by General Electric Co.). Modules 10 had an outside diameter of approximately 6 inches and a height of approximately 2 inches.

Figure 5:
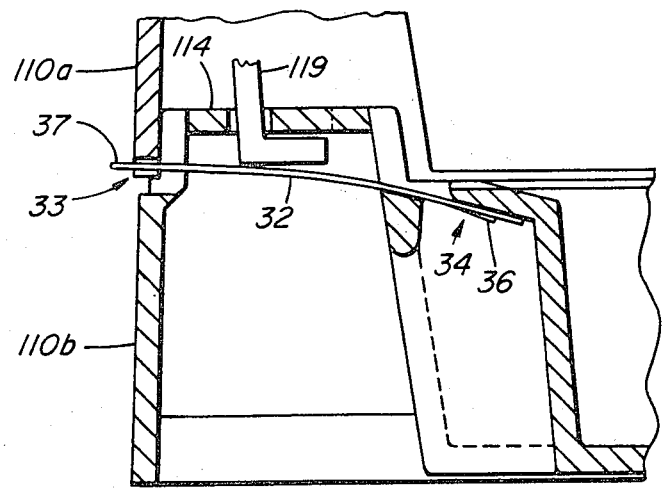
FIG. 5 is a partial sectional view, similar to that of FIG. 4, but additionally depicting a detent providing device in its latched position.

FIG. 5 depicts a preferred embodiment of the invention. FIG. 5 is similar to the FIG. 4 view, but more simplified and additionally depicts a detent mechanism 31 in its latched position. To aid in the description, parts in FIG. 5 corresponding to similar parts in FIGS. 1, 2, 3 and 4 have been referred to by a number increased by 100. Consequently, leg portion 119 of FIG. 5 corresponds to leg 19 of FIG. 1, module 110a corresponds to module 10a, etc.

Detent mechanism 31 comprises a spring 32 carried by module 110b and a mating notch 33 in module 110a. When modules 110a and 110b are rotated into their latched position (i.e. portion 23 is caught under surface 14) notch 33 comes into alignment with spring 32 and spring 32 enters notch 33; this prevents relative rotational movement of modules 110a and 110b, thereby providing a detect function.

Figure 6:
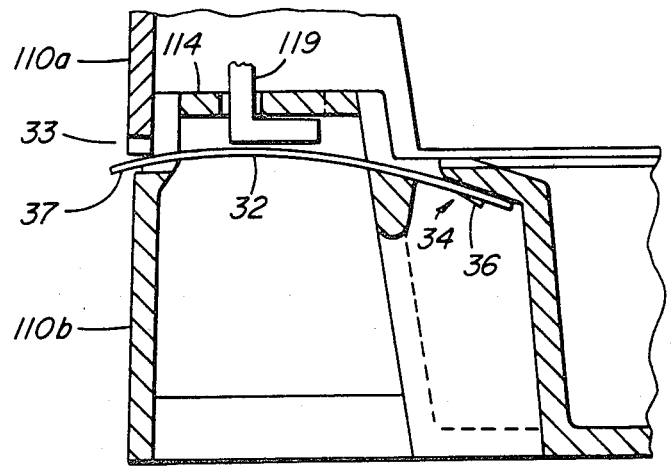
FIG. 6 is the same as FIG. 5 but depicted in its unlatched position.

FIG. 6 is the same as FIG. 5 but shows springs 32 in its unlatched position so as to allow modules 110a and 110b to rotate relative to one another. Spring 32 is depressed by the normal force of a human finger to cause its unlatching, while its latching is caused automatically by its own spring force.

Figure 7:
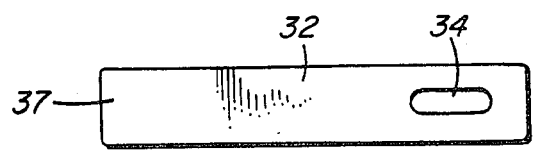
FIG. 7 depicts the detent providing device in more detail.

Spring 32 is shown in more detail in FIG. 7. Spring 32 is a flat leaf spring made from a piece of sheet steel and is approximately 2.13 inches long by 0.375 inches wide. Spring 32 has a slot 34 and a free-end 37. As can be seen in FIGS. 5 and 6, slot 34 of spring 32 engages lug 36 carried by module 110b. When module 110b is free standing, spring 32 is held in place at one end by notch 34 engaging lug 36 and at the other end by free-end 37 bearing against the lower surface of upper surface 114.

What is claimed is:

1. An interlocking support device for a video display unit or the like, said support device comprising:
   one or more generally identical modules;
   each said module having an upper section and a lower section, wherein both the lower section of said module can mate with the upper section of another module and the upper section of said module can mate with the lower section of another module;
   a plurality of leg means within the bounds of said module, protruding from said upper section toward said lower section;
   each said leg means supporting a lip member;
   a plurality of openings through the upper section, corresponding to said leg means;
   each said opening having both a large portion and a smaller portion such that the leg means of a mating module can pass through the large portion of said corresponding opening and upon relative rotation of two mating modules said leg means can enter said respective smaller portions of said openings whereby said lip members prevent the separation of said two modules along a longitudinal direction.

2. The support device of claim 1 wherein said leg means are three in number, evenly spaced about the periphery of said module and said plurality of openings are three in number, evenly spaced about the periphery of said module, the same distance from the center of the module as are the leg means.

3. The support device of claim 2 wherein said modules are ring-shaped.

4. The support device of claim 1 wherein each said module further includes a notch on the outer periphery of the lower section of said module, and a leaf spring carried by said module and having a free end protruding from the outer periphery of the upper section of said module, said notch and the free end of said spring so positioned that when two said modules are mated together, the free end of said spring engages said notch to thereby impede relative rotational movement between said two modules.

* * * * *